July 8, 1930.  N. SCHUSTER  1,770,242
CHILD'S VEHICLE
Filed June 23, 1928   2 Sheets-Sheet 1
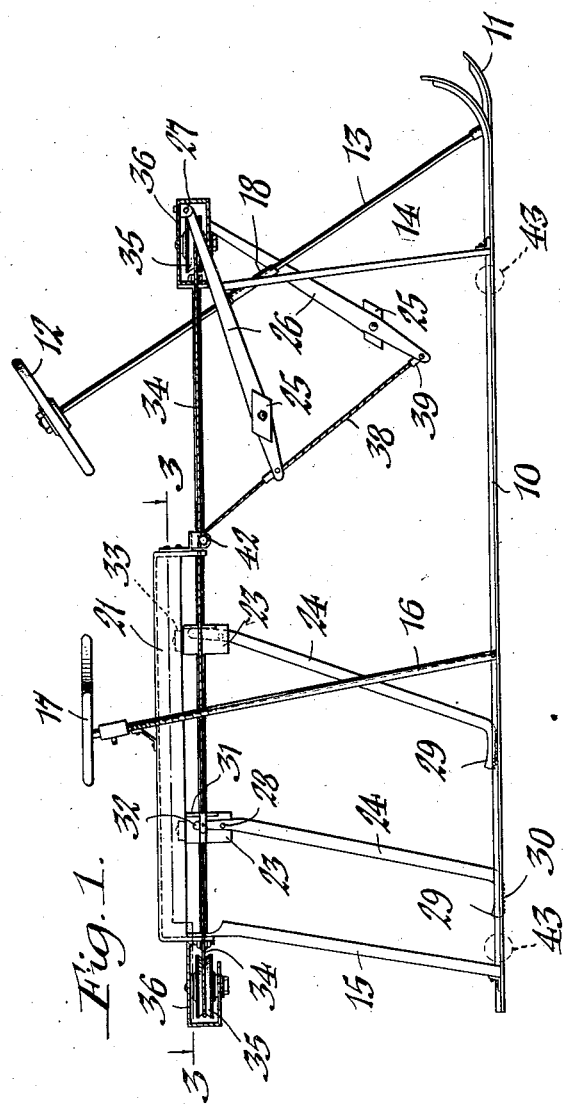
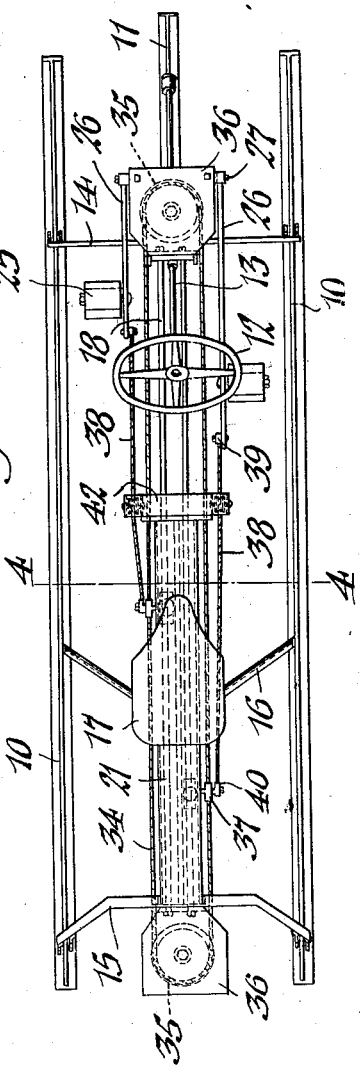
Inventor,
Nicholas Schuster,
by Geyer & Geyer
Attorneys.

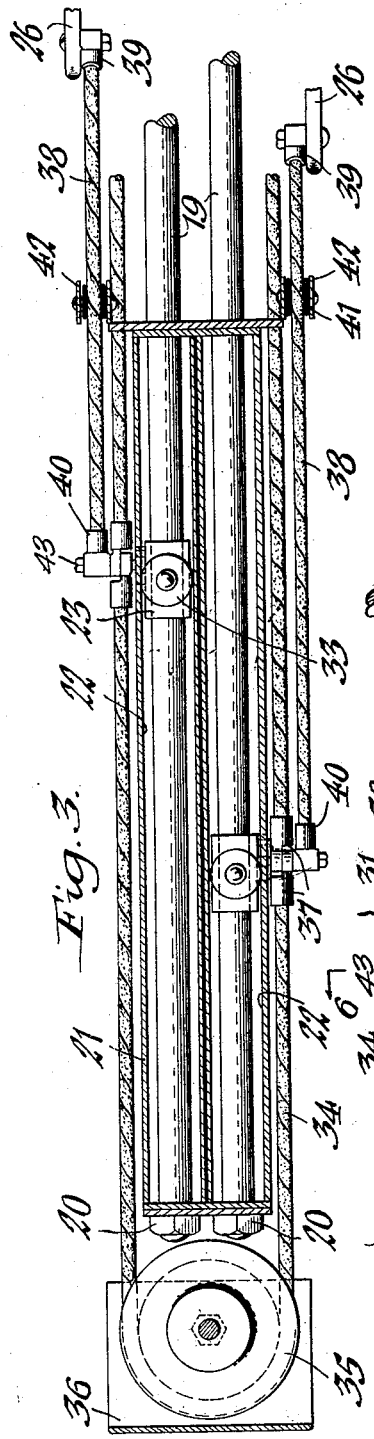

Patented July 8, 1930

1,770,242

UNITED STATES PATENT OFFICE

NICHOLAS SCHUSTER, OF BUFFALO, NEW YORK

CHILD'S VEHICLE

Application filed June 23, 1928. Serial No. 287,760.

This invention relates to improvements in self-driven vehicles, but more particularly to a child's vehicle which may be propelled by the rider over ice or snow.

Its object is the provision of a simple and inexpensive vehicle of this type whose parts are so organized and arranged as to enable the child to propel it with a minimum of effort.

Another object of the invention is to provide the vehicle with reciprocating ground-engaging elements actuated by the feet of the rider.

In the accompanying drawings:—

Figure 1 is a side elevation of a child's vehicle embodying my invention. Figure 2 is a top plan view thereof. Figure 3 is an enlarged fragmentary horizontal section taken substantially in the plane of line 3—3, Figure 1. Figure 4 is a transverse section on line 4—4, Figure 2. Figure 5 is an enlarged side elevation of one of the propelling elements and its associated parts. Fig. 6 is an enlarged fragmentary transverse section taken in the plane of line 6—6, Fig. 5.

Similar characters of reference indicate corresponding parts throughout the several views.

In the preferred embodiment of the invention shown in the drawings, the same comprises spaced, parallel runners 10, 10 and a steering runner 11 arranged between the front ends of the first-named runners and actuated by a steering wheel 12 attached to an inclined post 13 connected at its lower end to the runner 11. Rising from the front and rear ends of the runners 10 are suitable supports or brace members 14, 15, respectively, and intermediate these brace members is a third brace or support 16 to the upper end of which is fastened a seat 17 for the rider, the steering post 13 being journaled in a bearing 18 applied to the front brace 14, as seen in Figure 1.

19, 19 indicate horizontal guide rods disposed lengthwise of the vehicle in spaced relation and supported at their front and rear ends to the upper ends of the braces 14, 15, the ends of these rods being threaded and securely fastened to the braces by nuts 20. Surmounting the rear portions of the guide rods 19 is a rectangular cover-like member or casing 21 provided in its underside with a pair of downwardly opening longitudinal guide channels 22 which are disposed above and in axial alinement with the guide rods 19, as shown in Figures 3 and 4. Slidably mounted on the latter for alternate reciprocating movement are crossheads or slide blocks 23 which carry depending propelling elements 24 and which are actuated back and forth to propel the vehicle over the ice or snow by foot pedals 25 applied to vertically-swinging levers 26 fulcrumed at 27 to the front end of the vehicle. The propelling elements are preferably substantially L-shaped, each being pivoted at its upper end, as indicated at 28, to the corresponding slide block 23 while the rearwardly bent portion 29 at its lower end is provided at its lower edge with gripping teeth 30 which are adapted to bite into the ice or snow to propel the vehicle thereover. Projecting laterally from the side of each slide block is a stop lug or flange 31 which is arranged in the path of movement of the projecting upper end or arm 32 of the propelling element to limit its rearwardly swinging movement, as shown by dotted lines in Figure 5, this position showing the gripping portion 29 of the propelling element clear of the ground and inactive. The upper ends of the slide blocks have guide rollers 33 thereon which engage the corresponding channels 22 in the casing 21.

The slide blocks 23 and the propelling elements 24 carried thereby are adapted to be reciprocated in opposite directions for the purpose of alternately bringing these propelling elements into and out of gripping engagement with the ground, as the rider actuates the pedals 25, to compel the vehicle to travel in a forward direction. The preferred means for thus actuating the slide blocks, through the medium of the pedals, consists of an endless belt or cable 34 disposed in a horizontal plane lengthwise of the vehicle and encircling the guide rods 19, the front and rear ends of the cable passing around pulleys 35 journaled in suitable brackets 36 attached to the upper ends of the corresponding front and rear braces 14, 15. One of the longitudinal stretches of this endless cable is pivotally joined to the upper arm 32 of the corresponding propelling element by suitable coupling elements 37, while the other stretch thereof is joined to the upper arm of the companion propelling element by a similar coupling. The pedal levers 26 are adapted to transmit oscillatory movement to the endless cable 34 to reciprocate the propelling elements 24, and to this end the lower free ends of said pedal levers are connected to the companion slide blocks 23 by flexible connections, preferably consisting of cables 38 which are pivotally joined at their front ends to these levers by suitable couplings 39 and at their rear ends to the corresponding upper arms 32 of the propelling elements by similar connections 40, as clearly shown in Figure 3. The coupling elements or cable connections 37, 40 at each side of the vehicle may be pivotally mounted on a horizontally-disposed stud bolt 43 projecting outwardly from the corresponding arms of the propelling elements. The cables 38 are disposed parallel to and alongside the longitudinal stretches of the endless cable, and intermediate their ends they pass downwardly over guide pulleys 41 supported in a bracket 42 attached to the front end of the casing 21. By this construction, as the child alternately applies foot pressure to the pedal levers 26, the endless cable 34 is first moved in one direction to transmit motion to the propelling elements 24, one traveling in a rearward direction in gripping engagement with the ice or snow to move the vehicle forwardly and the other element simultaneously traveling in a forward direction and assuming the rearwardly-inclined position shown by dotted lines in Figure 5, wherein it is held out of engagement with the ground until it reaches the end of its forward stroke when it is automatically brought into gripping engagement as the companion propelling element is released at the end of its rearward stroke. When downward pressure is applied, say to the right hand foot lever, the corresponding cable 38 rocks the companion propelling element to the dotted line position shown in Figure 5, while the other foot lever is compelled to move upwardly through the medium of its connection to the endless cable 34 and the corresponding propelling element is caused to swing downwardly into gripping contact with the ground, the vehicle being moved forwardly relatively to the latter.

For adapting the vehicle for use on sidewalks and pavements, it may be equipped with wheels or casters 43 which can be detachably applied to the runners 10.

I claim as my invention:—

1. A self-propelled vehicle, comprising a frame, a horizontally-disposed endless belt extending lengthwise thereof, slides guided on said frame alongside the stretches of the belt for alternately reciprocating movement, propelling elements pivotally suspended intermediate their upper and lower ends from said slides to swing in a longitudinal direction into and out of gripping engagement with the ground, the upper arms of said propelling elements being operatively connected to the endless belt, and unitary means for transmitting motion to the belt to reciprocate said slides and for controlling the swinging movement of the propelling elements into and out of their gripping position, one of said elements being operative to propel the vehicle when the other is inoperative.

2. A self-propelled vehicle, comprising a frame, a horizontally-disposed endless belt extending lengthwise thereof, slides guided on said frame alongside the stretches of the belt for alternately reciprocating movement, propelling elements pivotally suspended intermediate their upper and lower ends from said slides to swing in a longitudinal direction into and out of gripping engagement with the ground, the upper arms of said propelling elements being operatively connected to the endless belt, vertically-swinging actuating levers fulcrumed on said frame forwardly of the propelling elements, and connections between said levers and the upper arms of said propelling elements.

3. A self-propelled vehicle, comprising a frame, a horizontally-disposed endless belt extending lengthwise thereof, slides guided on said frame alongside the stretches of the belt for alternately reciprocating movement, propelling elements pivotally suspended intermediate their upper and lower ends from said slides to swing in a longitudinal direction into and out of gripping engagement with the ground, the upper arms of said propelling elements being operatively connected to the endless belt, alternately movable actuating levers fulcrumed on said frame forwardly of the propelling elements, and flexible connections disposed parallel to the longitudinal stretches of the endless belt between said levers and the upper arms of said propelling elements for transmitting motion to said belt to reciprocate said slides and for controlling the swinging movements of said elements to their operative and inoperative positions.

4. A self-propelled vehicle, comprising a frame, a horizontally-disposed endless belt extending lengthwise thereof, slides guided on said frame alongside the stretches of the belt for alternately reciprocating movement, propelling elements pivotally suspended intermediate their upper and lower ends from said slides to swing in a longitudinal direction into and out of gripping engagement with the ground, the upper arms of said propelling elements being operatively connected to the endless belt, vertically-swinging foot levers fulcrumed on said frame and movable alternately in opposite directions to transmit oscillatory motion to said endless belt, and flexible connections connecting said levers to the upper arms of the propelling elements.

5. A self-propelled vehicle, comprising a frame, horizontally-disposed pulleys journaled at the front and rear ends of the frame, an endless belt passing around said pulleys, guide rods arranged lengthwise of the vehicle between side stretches of the belt, slides mounted on the guide rods for alternately reciprocating movement, propelling elements pivotally suspended intermediate their upper and lower ends from said slides to swing in a longitudinal direction into and out of gripping engagement with the ground, the upper arms of said propelling elements being joined to the endless belt, alternately-movable foot levers fulcrumed on said frame forwardly of the propelling elements, and cables connecting the free ends of said levers with the upper arms of said propelling elements.

6. A self-propelled vehicle, comprising a frame, an endless belt arranged lengthwise thereof, reciprocating slides guided on said frame and having laterally-disposed stop lugs at their front ends, propelling elements pivotally suspended intermediate their upper and lower ends from said slides to swing in a longitudinal direction into and out of gripping engagement with the ground, the upper arms of the propelling elements being joined to said endless belt and being arranged to engage said stop lugs in the non-gripping position of said elements, and actuating devices connected to the upper arms of the latter for transmitting motion to the belt to reciprocate said slides.

7. A self-propelled vehicle, comprising a frame, a horizontally-disposed endless belt extending lengthwise thereof, reciprocating slides guided for movement lengthwise on said frame alongside the stretches of said belt, pendant ground-engaging elements fulcrumed to said slides and joined to said belt above their fulcrums, and means actuated by the rider for oscillating said belt and for governing the movement of said ground-engaging elements into and out of their propelling positions, said means including fore and aft-swinging levers and flexible connections between said levers and those portions of said elements above their fulcrums.

NICHOLAS SCHUSTER.